May 6, 1930.                     H. J. ZIEMAN                    1,757,283
                                    LEVEL
                              Filed Jan. 10, 1927
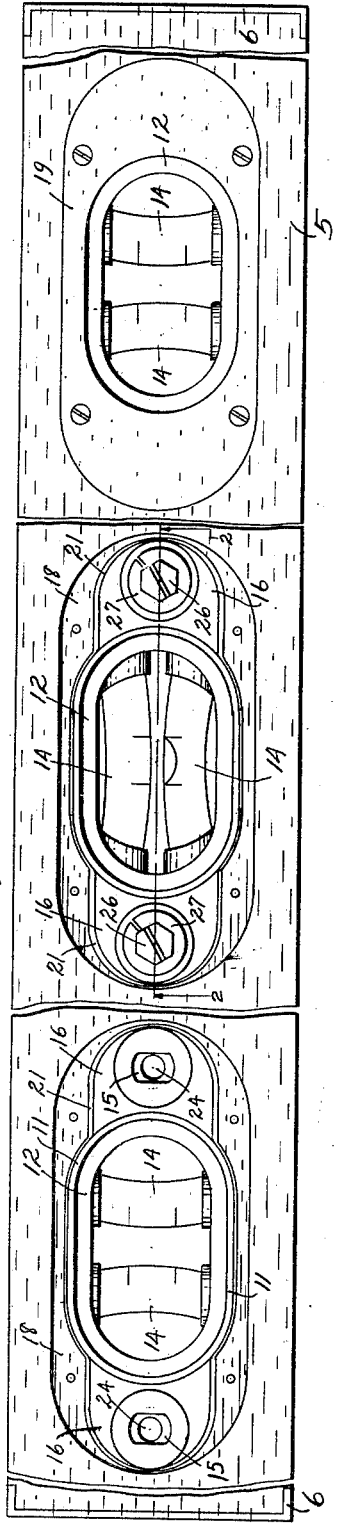
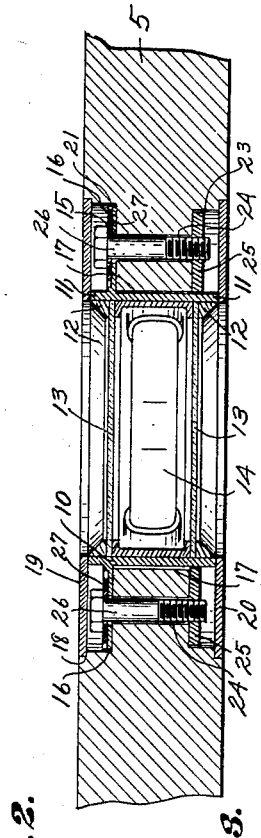
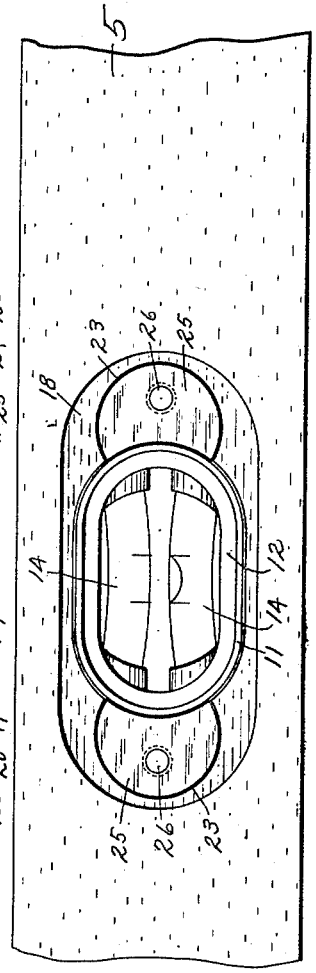
INVENTOR
Harry John Zieman
BY
Erwin, Wheeler & Woolard
ATTORNEY Patented May 6, 1930

1,757,283

UNITED STATES PATENT OFFICE

HARRY JOHN ZIEMAN, OF MILWAUKEE, WISCONSIN, ASSIGNOR TO EMPIRE LEVEL MANUFACTURING COMPANY, OF MILWAUKEE, WISCONSIN, A CORPORATION OF WISCONSIN

LEVEL

Application filed January 10, 1927. Serial No. 160,086.

This invention relates to improvements in levels.

It is the object of the invention to provide an improved mounting for the vial case in a wooden level frame, whereby the vial case may be adjusted without being subject to such looseness as usually resulted in previous attempts to make the vial case of a wooden level adjustable.

It is the further object of the invention to provide a construction in which the vial cases are readily interchangeable and in which the nuts used as a part of the securing means therefor are so fixed as to position that they are readily accessible at all times and will not require manipulation during the tightening of the bolts which interact therewith.

In the drawings:

Figure 1 is a side elevation of a wooden level frame showing three fixtures for vial cases in various degrees of assembly.

Figure 2 is a sectional view on line 2—2 of Figure 1.

Figure 3 is a fragmental side elevation of the opposite side of the level from that shown in Figure 1.

Like parts are identified by the same reference characters throughout the several views.

The level frame 5 is made of wood. It will be obvious that in Figure 1 the frame is foreshortened by breaking away portions thereof. The frame will preferably be bound at its ends in metal in the usual manner as indicated at 6.

The particular level herein disclosed has three openings for vial cases. The central opening is adapted to receive a vial case for horizontal readings and the two end openings are adapted to receive vial cases for vertical readings. In each instance, however, the vial cases are alike in external contour and accordingly the provision for mounting the vial cases in the several openings is the same throughout the device.

Each vial case 10 is elliptical in side elevation as shown. Its peripheral wall is extended at 11 upon either side to receive the retainers 12 for the glass 13 through which the vials 14 are viewed.

Integral with the peripheral wall of the vial case at one side thereof, are ears 16 which project from the ends of the vial case and are slotted at 15 as shown at the left hand side of Figure 1. These slots permit the ordinary limited degree of adjustment with reference to the clamping bolts which serves to permit the accurate setting of the vial case with reference to the level frame.

The level frame is provided with an opening at 17 which extends completely through the frame from one face to the other for the vial case proper. This opening is elliptical. On both sides of the frame are shallow recesses 18 for the cover plates 19 and 20. At one side of the frame, channels 21 are countersunk below recesses 18 to such a depth as to be adapted to receive the ears 16 of the vial case. It will be noted from Figure 1 that the channels have sufficient clearance with reference to such ears to permit of the minor adjustment which is necessary.

At the opposite side of the level frame are channels 23 which are concentric with channels 21 and eccentric to the bolt holes 24 which extend through the frame from channels 21 to 23.

The channels 23 receive crescent shaped nuts 25 which are tapped for threaded connection with bolts 26. The shape of channels 23 is such as to retain the nuts and prevent them from slipping into the elliptical opening in which the vial case is positioned. Lock washers 27 are preferably used under the heads of bolts 26, not for their usual purpose of preventing the counter-clockwise rotation of such bolts, but to take up any looseness which may result from shrinkage of the wooden frame.

It will be obvious that the bolts 26 acting on the ears 16 on one side of the level frame and upon the nuts 25 at the other side of the frame, will comprise a clamp which will rigidly engage the vial case with the frame and prevent any relative movement. The crescent shaped nuts not only provide a large surface but are secured against rotation during the tightening of the bolts due to the fact that each nut engages the end of the vial case and is, therefore, non-rotatable in its recess or channel.

When the vial case and its clamping mechanism are properly assembled and adjusted, cover plates 19 and 20 will be fixed in the recesses 18. Cover plate 20 may be nailed in place as a permanent fastening, whereas cover plate 19 is preferably screwed therein as shown in Figure 1. This leaves the device with a neat appearance while at the same time the vial case is readily accessible for adjustment or replacement.

By removing cover plate 19 access is had to the heads of bolts 26. These bolts may either be loosened or permit of the adjustment of the vial case or may be wholly removed to permit of the replacement of the vial case. If the bolts are removed the vial case can readily be withdrawn from opening 17 in the frame and a new one substituted. In such case the nuts 25 will be accurately confined in the circular depressions 23 which house them. They can be removed from such recesses by manipuation but will not escape accidentally therefrom under any ordinary circumstances.

It is found that a level constructed as herein disclosed will maintain its accuracy of adjustment as satisfactorily as does a metal level. This is particularly due to the form of clamp employed, it having been found that for the purposes herein disclosed a clamp is far more satisfactory than a wood screw or other similar means such as have heretofore been used in attempts to fix the position of an adjustable vial case in a wooden level frame. Furthermore, the adjustable members are concealed and thus protected from unauthorized tampering.

I claim:

In a device of the character described, the combination with a level frame having an aperture, and channels in its opposite faces communicating therewith, the channels in one face having circular sides converging toward said aperture, of a vial case fitting within said aperture and having ears extending into one set of channels, crescent shaped nuts in the channels having converging sides, and clamping bolts extending through said frame and engaging said ears and nuts, said frame being provided with cover plates for said channels having inner margins corresponding to the margins of said vial case.

HARRY JOHN ZIEMAN.